(12) United States Patent
Evans

(10) Patent No.: US 6,592,480 B2
(45) Date of Patent: Jul. 15, 2003

(54) BELT LOOPING

(75) Inventor: Nigel Evans, Sutton Coldfield (GB)

(73) Assignee: Light and Sound Design Ltd., Birmingham (GB)

( * ) Notice: Subject to any disclaimer, the term of this patent is extended or adjusted under 35 U.S.C. 154(b) by 0 days.

(21) Appl. No.: 09/780,616

(22) Filed: Feb. 8, 2001

(65) Prior Publication Data

US 2001/0046914 A1 Nov. 29, 2001

Related U.S. Application Data

(60) Provisional application No. 60/181,492, filed on Feb. 10, 2000.

(51) Int. Cl.[7] .............................. F16H 7/14; H04N 5/238
(52) U.S. Cl. ...................... 474/118; 474/117; 348/368
(58) Field of Search ................................ 474/118, 117, 474/112–114, 101; 358/225, 108, 209; 362/277, 322, 286, 293; 359/578, 892, 589, 264, 319, 234; 348/368, 373

(56) References Cited

U.S. PATENT DOCUMENTS

| | | | |
|---|---|---|---|
| 2,753,812 A | | 7/1956 | Wharton |
| 2,956,117 A | | 10/1960 | Ernst et al. |
| 3,859,862 A | * | 1/1975 | Brems .......................... 74/82 |
| 3,931,787 A | | 1/1976 | Kuttner et al. |
| 4,161,000 A | | 7/1979 | Cleveland |
| 4,231,643 A | * | 11/1980 | Demick et al. ............. 359/234 |
| 4,370,677 A | | 1/1983 | Baldwin et al. |
| 4,551,763 A | * | 11/1985 | Swinehart et al. .......... 348/368 |
| 4,571,629 A | * | 2/1986 | Horio et al. ................. 348/221 |
| 4,843,528 A | * | 6/1989 | Pearce-Harvey et al. ... 362/373 |
| 5,825,548 A | | 10/1998 | Bornhorst et al. |
| 6,352,357 B1 | * | 3/2002 | Woolard ..................... 362/277 |

* cited by examiner

Primary Examiner—Marcus Charles
(74) Attorney, Agent, or Firm—Fish & Richardson P.C.

(57) ABSTRACT

A high output light source, such as a stage lighting luminaire, produces light along a path. The belt which drives a driven device is kept away from that path by passing it around the opposite side of the pulley.

23 Claims, 2 Drawing Sheets

BELT LOOPING

CROSS-REFERENCE TO RELATED APPLICATIONS

This application claims benefit of U.S. Provisional Application No. 60/181,492, filed Feb. 10, 2000.

BACKGROUND

It is known to use belts to connect between a motor of a stage light, or luminaire, and a driven element of the stage light. Motors often drive the various mechanical elements of a luminaire and allow the luminaire to perform many of the different functions that it carries out.

Color changing elements for such a luminaire often effect color changing by moving a color changing element. Therefore the motor becomes an essential part of this function. Since the luminaire is designed for projecting on a stage, the light output is usually very intense. This intense light, or more specifically the light beam within the luminaire, can often generate large amounts of heat. This heat can significantly damage belts that drive mechanical elements within the luminaire, especially if they are located too close to the light beam. For instance, there are often space limitations which restrict the choice of location for a motor relative to it's associated driven element. In some cases, the conventional path followed by the drive belt places it in, or very close to the light beam. This becomes even more of a problem when the intensity of the light is increased. For example, in the Light and Sound Design™ Icon-M™, a 700 watt or even a 1200 watt bulb may be used. This can greatly increase the heat in such a system.

SUMMARY

The present application teaches an alternative method of using a belt to drive a driven element in a luminaire device, and specifically in such a device that uses a large amount of light, e.g., more than 300 watts, more preferably more than 500 watts, and even more preferably, more than 600 watts. The belt is run in a specific way to keep it away from the heat as much as possible.

DETAILED DESCRIPTION

Figure 2:
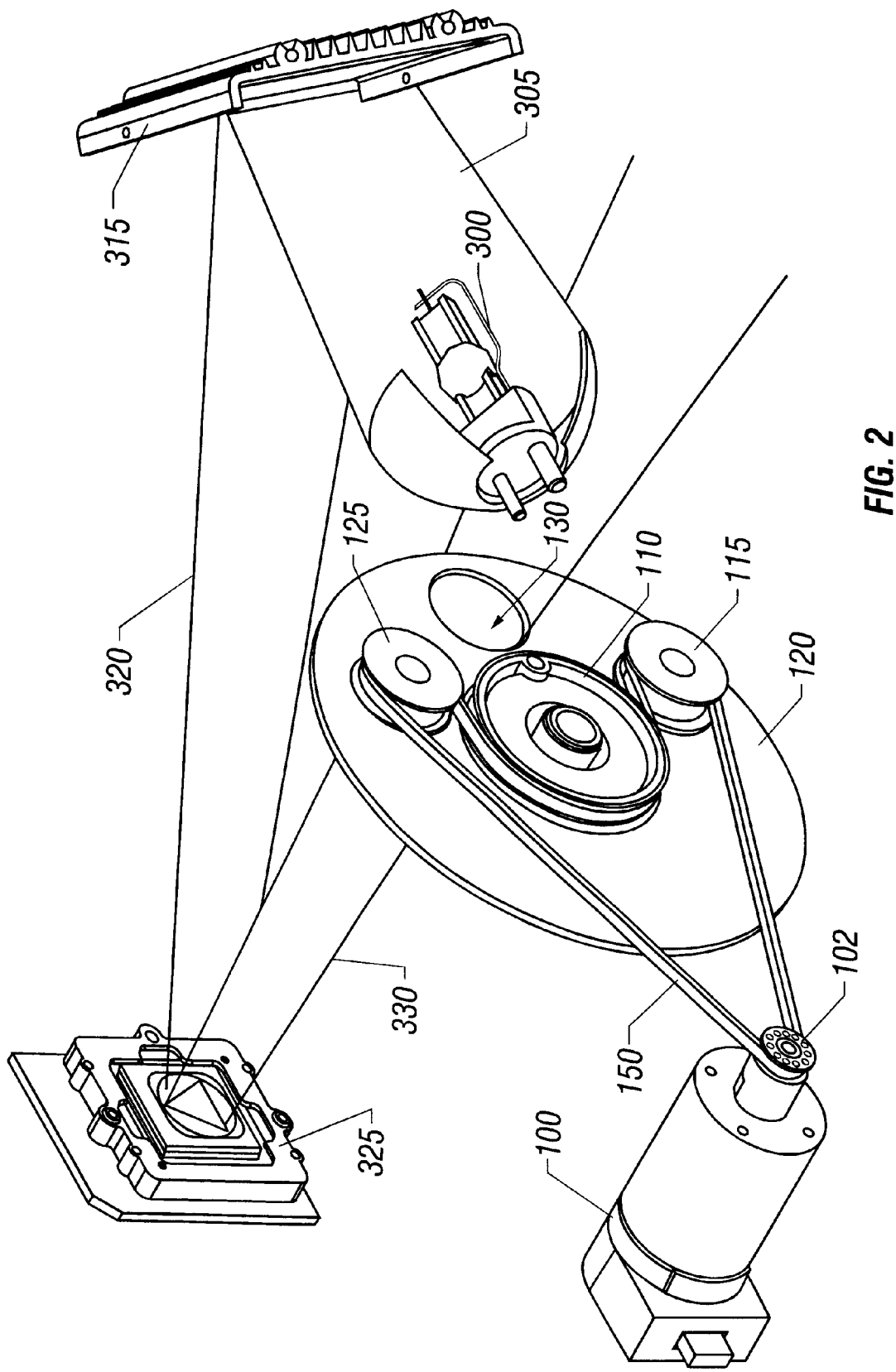
FIG. 2 shows a block diagram of the entire system.

A schematic view of the system is shown in FIG. 2. A lamp 300 produces a high intensity light beam 305. This light beam is directed onto a cold mirror 315 and some of the heat within the light beam is removed by the cold mirror, (due to the mirror's ability to pass infra red light and reflect visible light). The "cooled" light beam 320 is then coupled to a Digital Micromirror Device (DMD) 325, and reflected again as light beam 330. Even though some heat is removed from the light beam by the cold mirror, a significant amount of heat is usually still present in the reflected light beam, and enough that could damage a drive belt.

Driven element 120 is shown in the path of the light beam 330, although it could alternatively be in the path of light beam 320 or even light beam 305.

Figure 1:
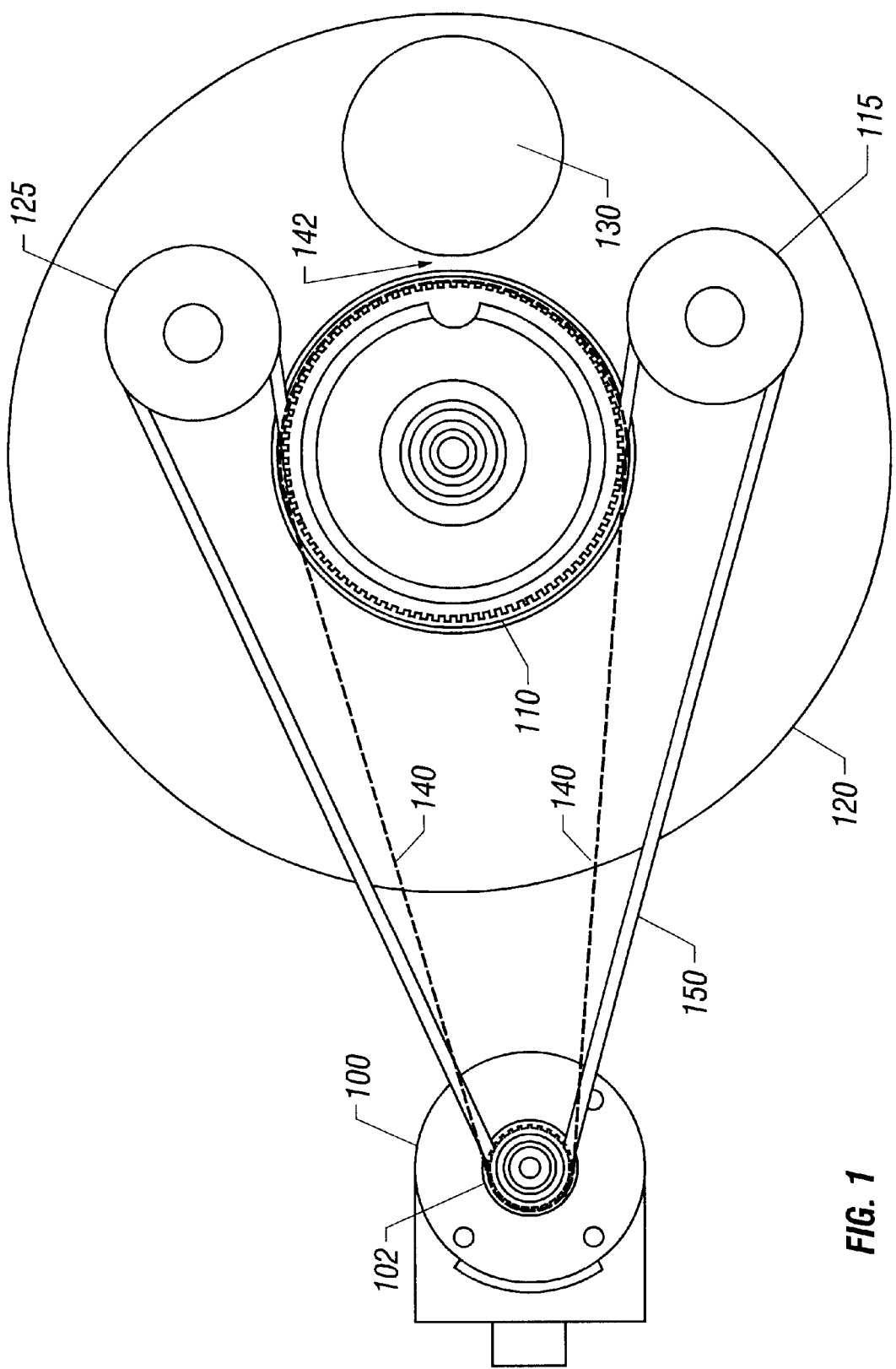
FIG. 1 shows a schematic of the belt paths.

A schematic of the driven element 120 is shown in FIG. 1. This system uses two idlers 115 and 125 maintaining drive to a pulley by means of a belt, but also keeping the belt out of the heat.

A motor 100 drives a pulley 102 that in turn drives the belt 150. The driven element 120 intersects the light gate 130, thereby altering the light in some way, e.g. altering the color or shape of the light. The driven element 120 is mounted on a pulley 110.

According to this system, two idlers shown as 115 and 125 are used. The belt is wrapped around the pulley 102, the outside of idler 125, around a portion of pulley 110 which is typically on the opposite side of the pulley to the light gate 130, and around the outside of idler 115.

In the disclosed embodiment, both sides of the belt are required to transmit drive, therefore a double-sided belt is used, (i.e. one having teeth on both sides). Alternative systems may use a single sided belt. For example, a second pair of idlers may be used to wrap the belt around a portion of pulley 102 in the same manner as for pulley 110.

Note that if the belt were connected around the pulley 110 in the conventional manner, it would pass along the path 140, and therefore close to the light gate 130. The conventional (prior art) system would cause the belt to come very close to the light gate at area 142. This heat can cause the belt to operate beyond its thermal limitations, and therefore can cause premature failure of the belt. The present system enables the belt to be kept away from the light gate, and consequently away from the heat.

Although only a few embodiments have been disclosed in detail above, other modifications are possible.

What is claimed is:

1. An apparatus, comprising:
    a rotatable driven element, which has a variable optical characteristics around a circumference thereof, such that said optical characteristic in a first area of the circumference is different than the optical characteristic in a second area of the circumference, said driven element including a pulley wheel, rigidly attached thereto, and a rotatable connection, around which said driven element can be rotated;
    a light gate, passing through an off-center portion of said rotatable driven element on a first side of said rotatable driven element; and
    a rotation device, comprising a motor and a belt, said belt passing between said motor and said pulley on said rotatable driven element, and passing via an off center portion on an opposite side of said pulley from the first side which includes the light gate.

2. An apparatus as in claim 1, wherein said belt is a double sided belt, a first surface of which couples to said motor, and a second surface of which couples to said pulley.

3. An apparatus as in claim 2, further comprising first and second idler, as part of said rotation device, and in contact with said first surface of said belt.

4. An apparatus as in claim 3, wherein said idlers are spaced from one another, on opposite sides of said driven element.

5. An apparatus as in claim 3, wherein said driven element is a color changing element.

6. An apparatus as in claim 1, wherein said light gate is formed by a light bulb that has a power output greater than 700 watts.

7. An apparatus as in claim 1, wherein said light gate is formed by a light bulb having an output of 1200 watts.

8. An apparatus as in claim 1, wherein said driven element alters a shape of the light.

9. An apparatus as in claim 1, wherein said driven element alters a color of the light.

10. An apparatus as in claim 1, wherein said belt is a dual sided belt that has two sides that each provide traction.

11. A method, comprising:
   using a motor to drive to rotate a rotatable driven element to a specific rotated position, which driven element has variable optical characteristics depending upon a position of rotation; and
   passing a belt around a pulley wheel attached to said rotatable driven element, said belt being passed around a side of the wheel that is closest to said motor and which is most distant from a light gate on said driven element through which said light is passed.

12. A method as in claim 11, further comprising using both surfaces of said belt to provide traction.

13. A method as in claim 12, wherein said passing the belt around a pulley wheel comprises using a first side of the belt to provide traction to a motor, and using the second side of the belt to provide traction to the pulley wheel.

14. A method as in claim 12, further comprising providing first and second idlers, spaced on opposite sides of said pulley wheel, said belt passing around said first and second idlers.

15. A method as in claim 14, further comprising passing the first side of the belt around said idlers.

16. A method, comprising:
   providing a beam of light along an axis, said beam of light being produced from a light bulb having an output greater than 700 watts;
   providing a rotatable driven element, which has variable optical characteristics depending on its position of rotation;
   defining a first location on a first side of said rotatable driven element as a light gate portion which is off center on said rotatable driven element, and passing said axis of said beam of light through said light gate portion; and
   using a motor and belt to rotate said driven element, said motor being on an opposite side of said rotatable driven element from the side having said light gate, and said pulley passing only on a side of said rotatable driven element which is opposite from the side of said light gate.

17. A method as in claim 16, wherein said using a motor and pulley comprises using a motor to provide friction against a first surface of said belt, and using a second surface of said belt opposite from said first surface, to provide friction which is used to rotate said rotatable driven element.

18. A method as in claim 16, wherein said rotatable driven element is substantially round in outer section.

19. A method as in claim 16, wherein said rotatable driven element includes a color changer.

20. A method as in claim 16, wherein said rotatable driven element includes a light shape altering device.

21. A method as in claim 16, further comprising providing first and second idlers, on opposite sides of said rotatable driven element, and wrapping said belt around said idlers, to press said belt against said pulley.

22. An apparatus, comprising:
   a substantially round optical element, which has first optical characteristics at a first point on a circumference thereof and second optical characteristics at a second point on a circumference thereof, said first optical characteristics being different than said second optical characteristics,
   a driving wheel, rigidly attached to said optical element, and connected for rotating said optical element in response to an applied rotational force;
   a light source, producing a beam of light at a power greater than 600 watts, and directing said beam of light to a light gate which passes through a part of said circumference which is not in the center of said optical element, and which includes at least said first and second points;
   a motor; and
   a belt, passing between said motor and said driving wheel, receiving rotational force from said motor on a first surface thereof, and applying said said rotational force to said driving wheel from a second surface thereof which is opposite to said first surface.

23. An apparatus as in claim 22, wherein said belt passes only on an opposite side of said driving wheel from the first side which includes the light gate.

* * * * *